(12) United States Patent
Shuler et al.

(10) Patent No.: US 10,268,666 B2
(45) Date of Patent: Apr. 23, 2019

(54) INDUSTRIAL AUTOMATION WORKSTATION AND DISPLAY METHOD FOR SCALING AND DISPLAYING TEXT DESTINED FOR A TARGET INDUSTRIAL AUTOMATION DEVICE

(71) Applicant: ROCKWELL AUTOMATION TECHNOLOGIES, INC., Mayfield Heights, OH (US)

(72) Inventors: Gregory J. Shuler, Milwaukee, WI (US); John H. McCauley, Germantown, WI (US); Michael A. Fuchs, Cary, NC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 594 days.

(21) Appl. No.: 14/067,331

(22) Filed: Oct. 30, 2013

(65) Prior Publication Data
US 2015/0121207 A1    Apr. 30, 2015

(51) Int. Cl.
G06F 17/00 (2006.01)
G06F 17/22 (2006.01)
G06F 17/21 (2006.01)
G05B 19/042 (2006.01)
G06F 3/14 (2006.01)
G09G 5/22 (2006.01)

(52) U.S. Cl.
CPC ........ *G06F 17/2264* (2013.01); *G06F 17/212* (2013.01); *G06F 17/214* (2013.01); *G05B 19/0423* (2013.01); *G05B 2219/23152* (2013.01); *G05B 2219/33348* (2013.01); *G06F 3/1454* (2013.01); *G09G 5/227* (2013.01)

(58) Field of Classification Search
CPC .. G06F 17/214; G06F 17/212; G06F 17/2264; G09G 2340/0407
See application file for complete search history.

(56) References Cited

U.S. PATENT DOCUMENTS 6,456,305 B1 * 9/2002 Qureshi ............ G06F 17/30905
707/E17.121
8,531,487 B2 * 9/2013 Snow ....................... G09G 5/14
345/660

(Continued)

FOREIGN PATENT DOCUMENTS

EP          2048651 A1    4/2009
EP          2592545 A2    5/2013
WO   WO 2013097202 A1 *  7/2013  ....... G06F 17/30905

*Primary Examiner* — Cesar B Paula
*Assistant Examiner* — David Faber

(57) ABSTRACT

An industrial automation workstation and display method for scaling and displaying text destined for a target industrial automation device are provided. The industrial automation workstation in one example embodiment includes a communication interface configured to transfer a display data including at least one text string to the industrial automation device and a processing system configured to obtain a target device dots-per-inch (DPI) for a display device of the industrial automation device, render the at least one text string at the device DPI, generate a scaling factor comprising a ratio of a workstation DPI divided by the target device DPI, scale the at least one text string using the scaling factor and generate a scaled text string, and display the scaled text string on a display device of the industrial automation workstation.

14 Claims, 5 Drawing Sheets

(56) References Cited

U.S. PATENT DOCUMENTS

| | | | | |
|---|---|---|---|---|
| 2002/0149588 A1* | 10/2002 | Babcock | ............... | G06F 9/451 |
| | | | | 345/468 |
| 2005/0068252 A1 | 3/2005 | Driver et al. | | |
| 2006/0174217 A1* | 8/2006 | Yan | ............... | G06F 8/38 |
| | | | | 715/866 |
| 2008/0030425 A1 | 2/2008 | Fullerton et al. | | |
| 2010/0299395 A1* | 11/2010 | Klassen | ............... | G06F 17/214 |
| | | | | 709/206 |
| 2012/0131437 A1* | 5/2012 | Zhu | ............... | G06F 17/30905 |
| | | | | 715/234 |
| 2013/0031205 A1* | 1/2013 | Jemiolo | ............... | H04N 21/2662 |
| | | | | 709/217 |
| 2013/0076797 A1* | 3/2013 | Hou | ............... | G09G 5/14 |
| | | | | 345/668 |
| 2013/0179771 A1* | 7/2013 | Dent | ............... | G06F 17/211 |
| | | | | 715/234 |
| 2013/0335424 A1* | 12/2013 | Wang | ............... | G06T 11/203 |
| | | | | 345/467 |
| 2014/0040721 A1* | 2/2014 | Brownlow | ............... | G06F 17/24 |
| | | | | 715/234 |
| 2014/0380137 A1* | 12/2014 | Zhang | ............... | G06F 17/30905 |
| | | | | 715/202 |

* cited by examiner

INDUSTRIAL AUTOMATION WORKSTATION AND DISPLAY METHOD FOR SCALING AND DISPLAYING TEXT DESTINED FOR A TARGET INDUSTRIAL AUTOMATION DEVICE

TECHNICAL BACKGROUND

Industrial automation installations comprise multiple computerized devices that control industrial machines and industrial processes. The components of an industrial automation installation must work together in a coordinated fashion, performing operations such as exchanging data, controlling the timing and scheduling of processes, providing information to operators or technicians, and receiving operator inputs.

Computerized devices used in an industrial automation installation comprise Human Machine Interface (HMI) devices. HMI devices may include operator input devices and operator output devices. Operator output devices can include displays that display information to the operator or technician. The displayed information can include text and/or alphanumeric data.

However, the operational software for the industrial automation installation and the individual HMI devices can be developed on multiple other computerized devices, such as on industrial automation workstations. The industrial automation workstations may differ from the HMI devices that store and execute the software. As a result, a display density, typically measured in dots-per-inch (DPI), may differ between the industrial automation workstations and the HMI industrial automation devices. Display data that is properly formatted and presented on an industrial automation workstation may be improperly formatted and presented on an industrial automation device. This is more likely to be a problem where the display density of the industrial automation device differs from the display density of the industrial automation workstation.

OVERVIEW

An industrial automation workstation and display method for scaling and displaying text destined for a target industrial automation device are provided. The industrial automation workstation in one example embodiment includes a communication interface configured to transfer a display data including at least one text string to the industrial automation device and a processing system configured to obtain a target device dots-per-inch (DPI) for a display device of the industrial automation device, render the at least one text string at the device DPI, generate a scaling factor comprising a ratio of a workstation DPI divided by the target device DPI, scale the at least one text string using the scaling factor and generate a scaled text string, and display the scaled text string on a display device of the industrial automation workstation.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
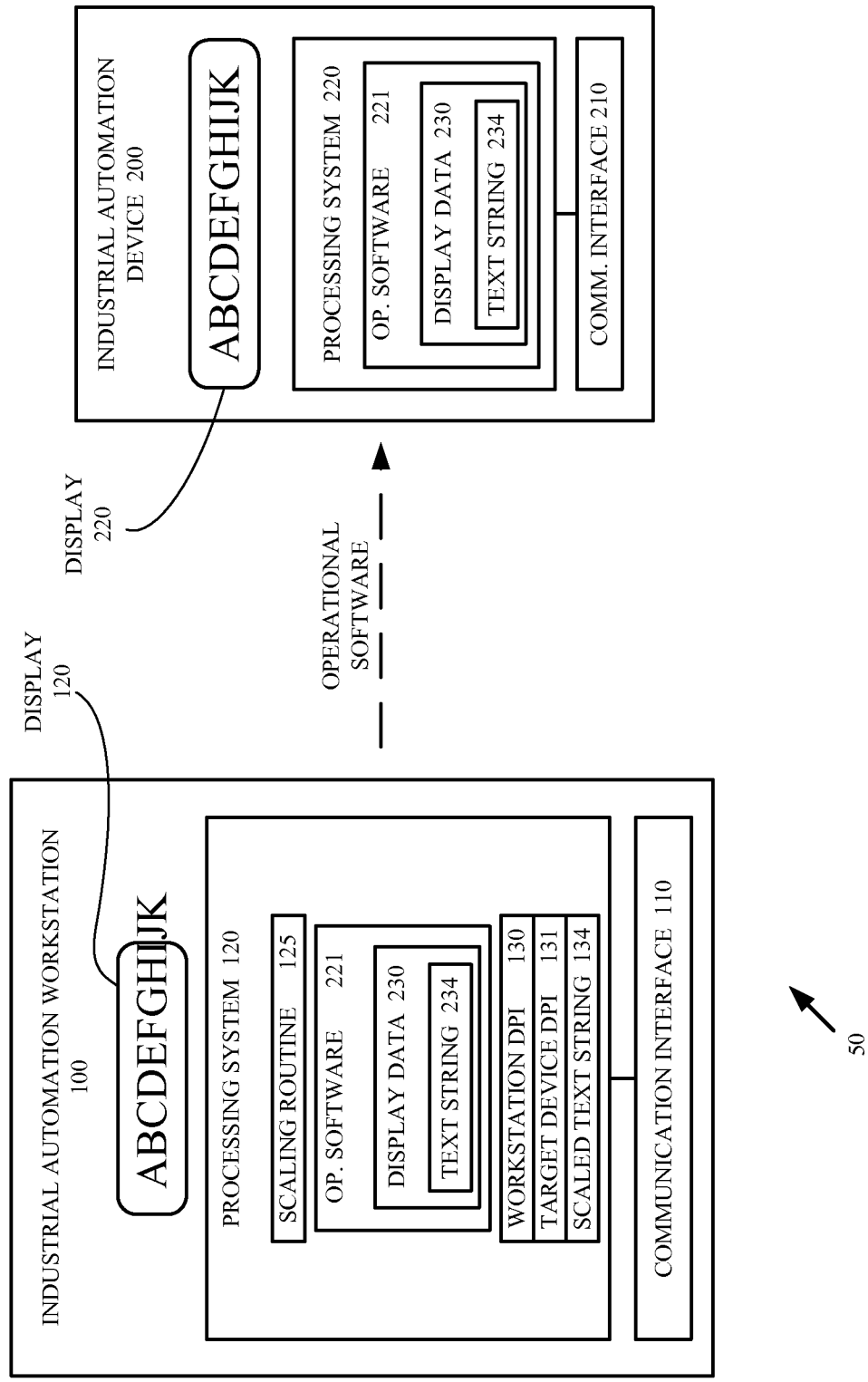
FIG. 1 shows an exemplary industrial automation design environment.

FIG. 1 shows an exemplary industrial automation design environment 50 including at least one industrial automation workstation 100 and at least one industrial automation device 200. The industrial automation workstation 100 is configured to scale and display text destined for a target industrial automation device 200. The industrial automation workstation 100 can be used by a software designer or designers to create operational software 221 to be provided to any number of industrial automation devices 200. The operational software 221 will be transferred to or programmed into the industrial automation device 200.

The industrial automation device 200 can be used in an industrial automation environment (not shown) to control or operate an industrial process. The industrial automation environment may include a plurality of industrial automation devices 200. A network of industrial automation devices 200 can monitor and control various aspects of an industrial automation installation. The plurality of industrial automation devices 200 may vary according to a task being performed or according to industrial devices being operated.

The industrial automation device 200 includes an electronic display device 220 that is capable of displaying at least one text string. The at least one text string comprises a sequence of alphanumeric characters or symbols, hereinafter referred to as a "text string" for simplicity. It should be understood that the term "text string" as used herein includes any manner of alphanumeric characters or symbols, including characters in various human languages and including specialized characters used in industrial automation environments. The display device 220 can comprise any suitable type of electronic display device. The display device 220 can comprise an alphanumeric display or can include one or more alphanumeric display elements.

The industrial automation workstation 100 comprises a computer workstation for the design and implementation of at least a portion of the industrial automation design environment 50. The industrial automation workstation 100 can be used by an industrial automation designer to create and test industrial automation software for the industrial automation design environment 50. The industrial automation workstation 100 can be used by an industrial automation designer to create and test industrial automation hardware for the industrial automation design environment 50. The industrial automation workstation 100 can be used by an industrial automation designer to monitor the operation and performance of at least a portion of the industrial automation design environment 50.

One design and test function that can be performed by the industrial automation workstation 100 is the design and testing of display operations in the industrial automation device 200. The industrial automation workstation 100 can create text displays that are engineered for proper visual display on the display device 220 of the industrial automation device 200.

In one example, the industrial automation workstation 100 creates display data including one or more display text strings 134 that are to be transferred to the industrial automation device 200. The industrial automation workstation 100 can create text strings 134 that are engineered for proper display on the display device 220 of the industrial automation device 200. The one or more display text strings 134 can subsequently be displayed by the industrial automation device 200 on the display device 220. Being able to show the text at one DPI (for the designer) and also identically displaying the text on a different target device DPI (at the terminal) makes for accurate screen creation and aids in software re-use for operations like project conversion (changing screen size to match a different terminal's dimensions).

A pixel is a relative length unit that represents the smallest amount of information that can be displayed on a display device, and appears on the display device as a dot. Consequently, the display device resolution is commonly expressed in dots-per-inch (DPI). It should be understood that other linear measurement units can be employed.

When the display resolution/number of pixels per inch increases, the spacing between the individual pixels correspondingly decreases. Doubling the density of the pixels may halve the size of the text, so that the text is no longer easily readable in some examples.

The number of pixels used to render text is dependent on the point size and the DPI resolution employed by the relevant operating system (O/S) of the industrial automation device 200. A font point is a physical measurement that text achieves independent of the O/S DPI (i.e., the commonly-employed standard is that one font point is a dot of $1/72$ of an inch in physical size while one pixel is 1/DPI of an inch). The physical width of a text string, when displayed at different DPI values, varies randomly between font families, point sizes, bold and italic font effects, and so forth. This presents a problem if text is to be displayed at a first DPI on a first device and the display text is to be displayed at a second DPI on a second device. The text string will have a different physical width on the industrial automation device 200, resulting in a non-"what you see is what you get" (non-wysisyg) rendering of the text. This further becomes a problem if the text is contained within a border that is physically sized correctly between the different DPI devices, causing the text to be too large relative to its dimensions (and consequently be clipped off).

Intercepting the call to the O/S for the DPI and scaling the text for display on the industrial automation workstation 100 enables accurate text reproduction and presentation on a variety of different display devices, including on the industrial automation workstation 100, and therefore enables the uniform display of text. Moreover, scaling enables the text to be correctly displayed at a different DPI while elements around the text remained proportionally sized.

The industrial automation workstation 100 includes a display device 120. The industrial automation workstation 100 includes a communication interface 110 configured to communicate with the industrial automation workstation 100 and transfer the operational software 221 to the industrial automation device 200. The communication interface 110 is further configured to transfer a display data 230 including at least one text string 234 to the industrial automation device 200. The display data 230 is included in the operational software 221.

The industrial automation workstation 100 further includes a processing system 120 coupled to the display device 120 and the communication interface 110. The processing system 120 stores and includes software routines, operational values, and other data. The processing system 120 in the example shown includes a scaling routine 125, an operational software 221, a workstation DPI 130, a target device DPI 131, and scaled text string 134.

The operational software 221 includes executable instructions for execution in the industrial automation device 200. The operational software 221 also includes display data 230 for generating displays on the display device 220 of the industrial automation device 200, with the display data 230 further including at least one text string 234. The at least one text string 234 is designed to be properly displayed on the display device 220 of the industrial automation device 200. The at least one text string 234 is designed to accommodate a display DPI of the display 220 of the industrial automation workstation 100. For example, the display 220 of the industrial automation workstation 100 can have a display DPI of 140, while the display device 120 of the industrial automation workstation 100 can have a display DPI of 100.

Because the at least one text string 234 is designed for display by the display device 220 of the industrial automation device 200, the at least one text string 234 may not display properly on the display device 120 of the industrial automation workstation 100. This presents a problem for the software designer, who will want to ensure that the at least one text string 234 will be properly displayed on the industrial automation device 200. The software designer will not want to finalize the operational software 221 for the industrial automation device 200 until the software designer can be confident that the at least one text string 234 will be properly displayed.

The scaling routine 125 is configured to obtain the target device DPI 131 for the industrial automation device 200. The scaling routine 125 is configured to render the at least one text string 134 at the device DPI 131. The scaling routine 125 is configured to generate a scaling factor from the workstation DPI 130 and the target device DPI 131. The scaling routine 125 is configured to scale the at least one text string 234 of the operational software 221 and generate a scaled text string 134 that was rendered with the device DPI 131 of the industrial automation device 200. The scaling routine 125 is configured to display the scaled text string 134, such as on the display device 120 of the industrial automation workstation 100.

The workstation DPI 130 comprises a display DPI value for the display device 120 of the industrial automation workstation 100. The workstation DPI 130 controls how alphanumeric text strings are displayed on the display device 120 of the industrial automation workstation 100. The workstation DPI 130 will remain substantially constant in most circumstances, unless a physical change is made to the industrial automation workstation 100, for example.

The target device DPI 131 comprises a display DPI value for the display device 220 of the industrial automation device 200. In contrast to the workstation DPI 130, the target device DPI 131 may vary, and will vary according to the display device 220 of the target industrial automation device 200. The target device DPI 131 controls how alphanumeric text strings are displayed on the display device 220 of the industrial automation device 200.

The scaled text string 134 comprises a scaled version of the at least one text string 234. The scaled text string 134 comprises a sequence of alphanumeric characters or symbols wherein the non-alphanumeric display elements of the display data 230 are scaled using the scaling factor (but do not need to be rendered). The scaled text string 134 is scaled to be properly displayed on the display device 120 of the industrial automation workstation 100, and not on the industrial automation device 200. The scaled text string 134 is therefore scaled to properly display the workstation DPI 130.

In some examples, the scaling routine 125 when executed by the industrial automation workstation 100 in general or the processing system 120 in particular operates to direct the industrial automation workstation 100 or the processing system 120 to obtain a target device DPI 131 for a display device 220 of the industrial automation device 200, render the at least one text string 134 at the device DPI 131, generate a scaling factor comprising a ratio of a workstation DPI 130 divided by the target device DPI 131, scale the at least one text string 234 using the scaling factor and generate scaled text string 134, and display the scaled text string on a display device 120 of the industrial automation workstation 100.

Figure 2:
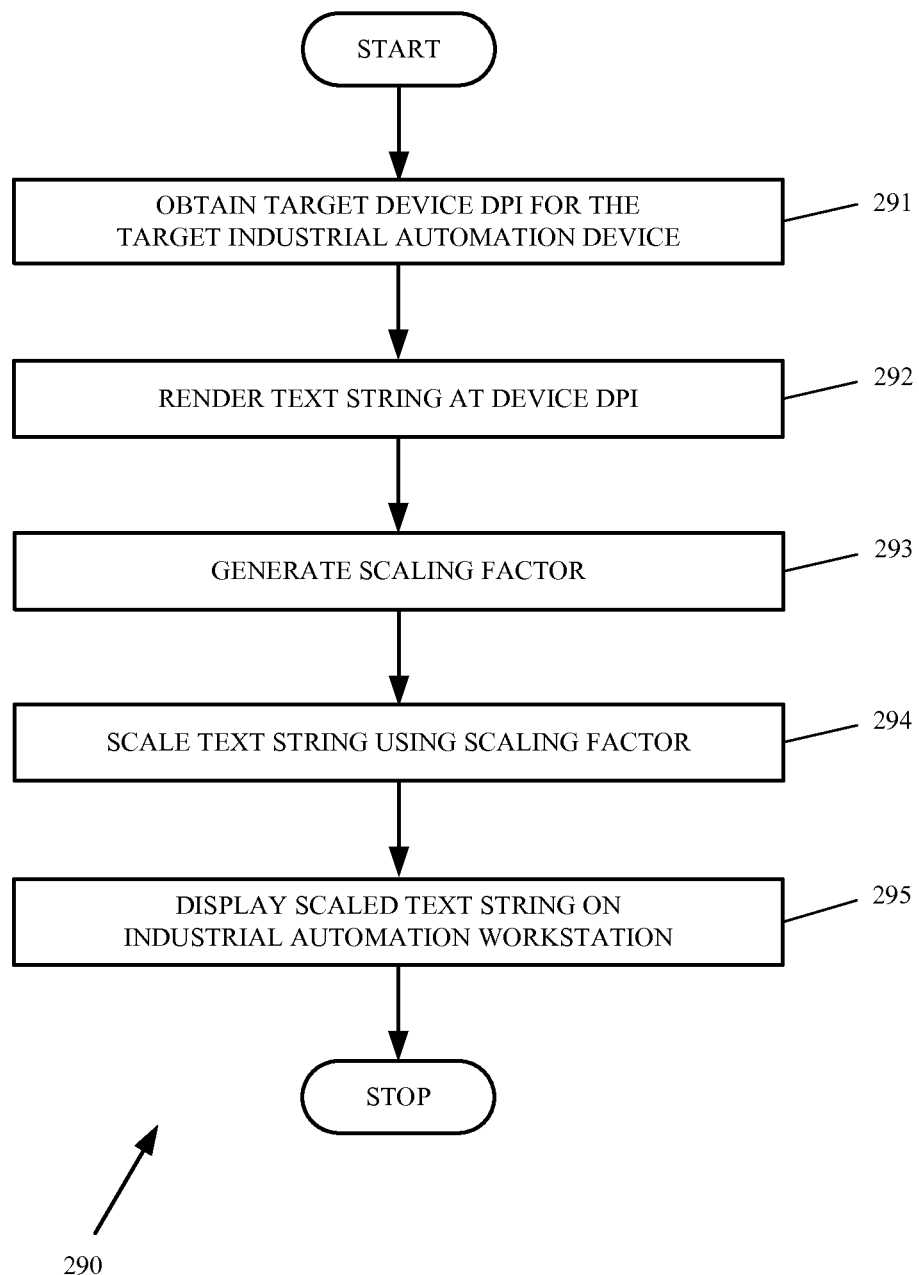
FIG. 2 shows a flowchart of an exemplary display method in an industrial automation workstation for scaling and displaying text destined for a target industrial automation device.

FIG. 2 shows a flowchart 290 of an exemplary display method in an industrial automation workstation for scaling and displaying text destined for a target industrial automation device. In step 291, the industrial automation workstation obtains a target device DPI for a display device of the target industrial automation device. The target device DPI reflects a DPI value that the industrial automation device will employ in displaying data, including text. The target device DPI may differ from a workstation DPI used in the industrial automation workstation.

In one example, the industrial automation workstation inspects the operational software to be transferred to the industrial automation device and determines the target device DPI value from the operational software. Calls to the O/S to obtain the workstation DPI of the industrial automation workstation are intercepted and the workstation DPI is replaced with the device DPI instead.

In step 292, the industrial automation workstation renders the at least one text string at the device DPI, instead of using a workstation DPI. The text, when rendered at the device DPI, will most likely be too large or too small for the industrial automation workstation. This requires that the DPI ratio of step 293 be subsequently applied (see below) so the displayed text is substantially the same physical size as the other non-text objects displayed by the industrial automation workstation. By rendering the text at the device DPI, the same number of pixels are used for the text when displayed on the industrial automation workstation, wherein the resulting number of pixels is determined by the O/S font-rendering algorithm. After scaling the text to the workstation DPI, the text width will correspond to the non-text physically-sized display content.

In step 293, the industrial automation workstation generates a scaling factor comprising a ratio of a workstation DPI divided by the target device DPI (i.e., workstation DPI/target device DPI). Therefore, for example, if the workstation DPI is 200 DPI and the target device DPI is 100 DPI, then the scaling factor would equal (200/100) or a factor or multiplier of 2. In this example, the scaling of a text string for the industrial automation workstation would comprise doubling the DPI of the text string so that the resulting scaled text string will be substantially equal in size on the 200 DPI display of the industrial automation workstation as the original text string will be on the 100 DPI display of the industrial automation device.

In step 294, the industrial automation workstation scales the at least one text string using the scaling factor and generates a scaled text string. The scaled text string is a scaled version of the at least one text string destined for the target industrial automation device. The scaled text string comprises a sequence of alphanumeric characters or symbols wherein the non-alphanumeric display elements of the display data are scaled using the scaling factor. The scaled text string is now physically sized for display by the industrial automation workstation.

In step 295, the industrial automation workstation displays the scaled text string. Therefore, the scaled text string can be visually inspected and verified by the software designer.

Figure 3:
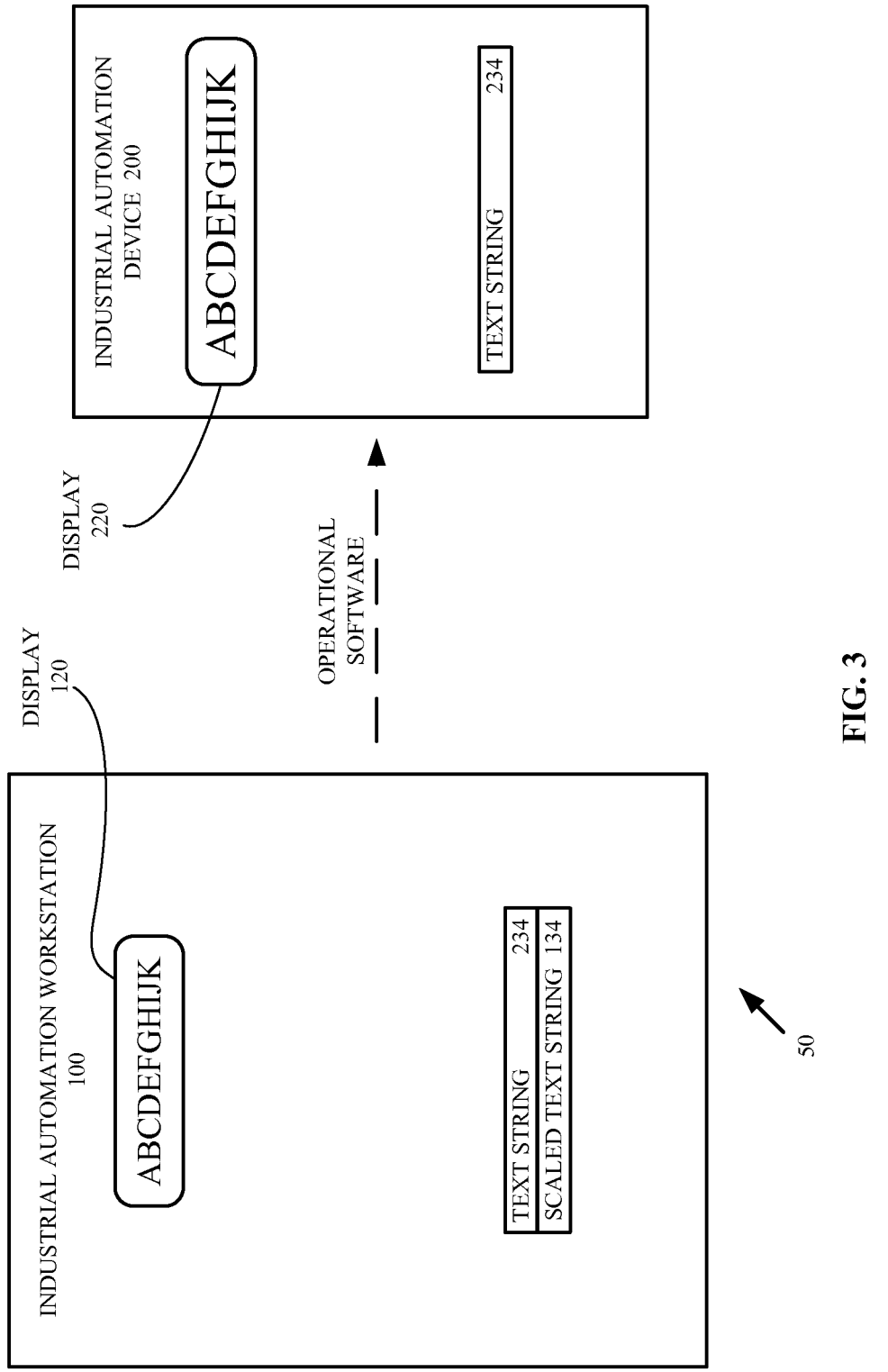
FIG. 3 shows the industrial automation workstation wherein a text string has been scaled to fit a display device.

FIG. 3 shows the industrial automation workstation 100 wherein the text string 234 has been scaled to fit the display device 120. The industrial automation workstation 100 can further include the components, routines, and data disclosed in other figures. It can be seen that, in contrast to FIG. 1, it can be seen that the entirety of the scaled text string 134 fits the display device 120. The scaled text string 134 is of a size and resolution to be properly displayed on the display device 120 of the industrial automation workstation 100.

Figure 4:
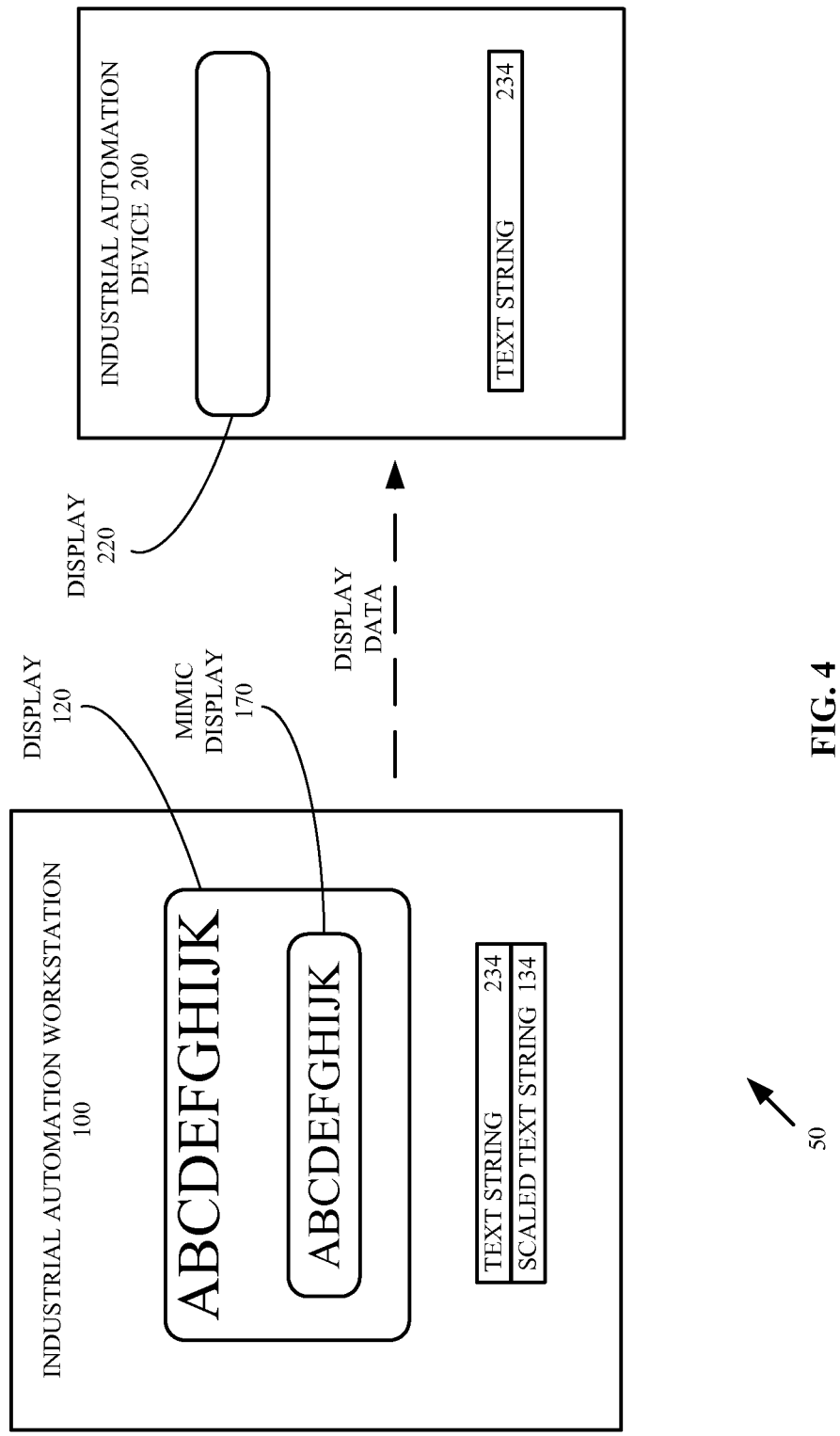
FIG. 4 shows an industrial automation workstation including a mimic display generated within the display device of the industrial automation workstation.

FIG. 4 shows the industrial automation workstation 100 including a mimic display 170 generated within the display device 120 of the industrial automation workstation 100. The industrial automation workstation 100 can further include the components, routines, and data disclosed in other figures. The mimic display 170 comprises a portion of the display device 120 of the industrial automation workstation 100 in some examples. The mimic display 170 can be of the same DPI value as the display device 220 of the target industrial automation device 200 or can have a different DPI value. The industrial automation workstation 100 displays the scaled text string 134 on the mimic display 170. An industrial automation designer can therefore perform a simulation of the text string 234 as it would appear on the industrial automation device 200.

Figure 5:
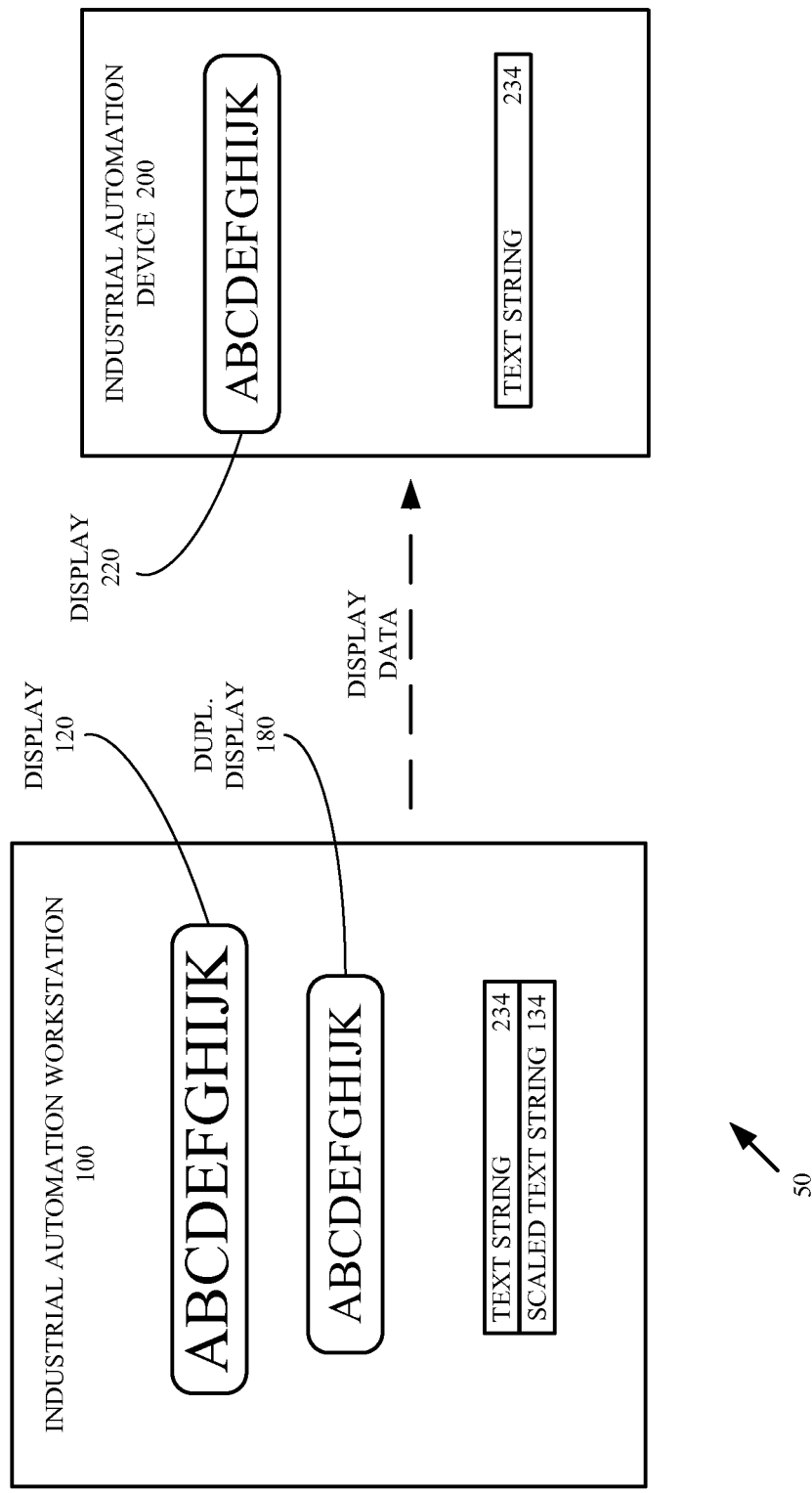
FIG. 5 shows the industrial automation workstation including (or coupled to) at least one duplicate display of the industrial automation workstation.

FIG. 5 shows the industrial automation workstation 100 including (or coupled to) a duplicate display 180 of the industrial automation workstation 100. The industrial automation workstation 100 can further include the components, routines, and data disclosed in other figures. The at least one duplicate display 180 is included in the industrial automation workstation 100 in addition to the display device 120 in some examples. The industrial automation workstation 100 displays the scaled text string 134 on the at least one duplicate display 180. An industrial automation designer can therefore perform a simulation of the text string 234 as it would appear on the industrial automation device 200. Consequently, the industrial automation workstation 100 can display the scaled text string 134 on both the display device 120 and on the duplicate display 180.

The at least one duplicate display 180 can be of the same DPI value as the display device 220 of the target industrial automation device 200 or can have a different DPI value. However, it would be unlikely that the at least one duplicate display 180 could be chosen to match both the industrial automation device 200 and the industrial automation workstation 100, at least not over a variety of industrial automation devices 200.

Referring again to FIG. 1, the industrial automation device can comprise a controller or control device that controls one or more industrial automation components or controls at least a portion of an industrial process. The industrial automation device can comprise a monitor or monitoring device that monitors one or more industrial automation components or monitors at least a portion of an industrial process. The industrial automation device can comprise a measurement device that measures one or more industrial automation components or measures at least a portion of an industrial process. The industrial automation device can comprise a data-gathering or data-relaying device that exchanges communications with other devices of an industrial automation environment. The industrial automation device can comprise various combinations of the above devices. Other and additional industrial automation devices are contemplated and are within the scope of the description and claims.

The display device of the industrial automation workstation and/or the industrial automation device can include any manner of display device, including a CRT display device, a LCD display device, a LED display device, a fluorescent or phosphorescent display device, or a projection display device, or other displays.

The communication interface comprises a network card, network interface, port, or interface circuitry that allows the industrial automation workstation or the industrial automation device to communicate, including over a network or networks or wirelessly. The communication interface may also include a memory device, software, processing circuitry, or some other device. The communication interface can use any suitable communication protocol to exchange communications.

The communication interface includes equipment and circuitry for receiving user input and control, such as for engaging in voice calls or data sessions, and receiving user instructions for text messages or video messages, among other operations. Examples of the equipment and circuitry for receiving user input and control include graphical user interfaces, push buttons, touch screens, selection knobs, dials, switches, actuators, keys, keyboards, pointer devices, microphones, transducers, potentiometers, non-contact sensing circuitry, accelerometers, or other human-interface equipment. The communication interface also includes equipment to communicate information to a user of the industrial automation workstation or the industrial automation device. Examples of the equipment to communicate information to the user could include displays, graphical user interfaces, indicator lights, lamps, light-emitting diodes, haptic feedback devices, audible signal transducers, speakers, buzzers, alarms, vibration devices, or other indicator equipment, including combinations thereof.

The processing system in some examples can comprise one or more microprocessors and other circuitry that retrieves and executes the scaling routine. The processing system can be implemented within a single processing device but can also be distributed across multiple processing devices or sub-systems that cooperate in executing program instructions. Examples of the processing system include general purpose central processing units, application specific processors, and logic devices, as well as any other type of processing device, combinations, or variations thereof.

In some examples, the processing system includes a computer readable storage media capable of storing the scaling routine. The processing system can include volatile and nonvolatile, removable and non-removable media implemented in any method or technology for storage of information, such as computer readable instructions, data structures, program modules, or other data.

Data may be stored in and recalled from a storage system in the industrial automation workstation or the industrial automation device. The storage system can comprise any computer readable storage media readable by the processing system and capable of storing the scaling routine. The storage system can include volatile and nonvolatile, removable and non-removable media implemented in any method or technology for storage of information, such as computer readable instructions, data structures, program modules, or other data. The storage system may be independent from or integrated into the processing system.

In addition to storage media, in some implementations the storage system can also include communication media over which the scaling routine can be communicated. The storage system can be implemented as a single storage device but can also be implemented across multiple storage devices or sub-systems co-located or distributed relative to each other. The storage system can comprise additional elements, such as a controller, capable of communicating with the processing system. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

In addition to storage media, in some examples the processing system can also include communication media over which the scaling routine can be communicated. The processing system can be implemented to include a single storage device but can also be implemented to include multiple storage devices or sub-systems co-located or distributed relative to each other. The processing system can comprise additional elements, such as a controller, capable of communicating with the storage media. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

In general, the scaling routine can, when loaded into the processing system and executed, transform the processing system into a special-purpose computing system configured to scale a text string for display, among other operations. Encoding the scaling routine on the processing system can transform the physical structure of the processing system. The specific transformation of the physical structure can depend on various factors in different implementations of this description. Examples of such factors can include, but are not limited to the technology used to implement the storage media of the processing system and whether the computer-storage media are characterized as primary or secondary storage. For example, if the computer-storage media are implemented as semiconductor-based memory, the scaling routine can transform the physical state of the semiconductor memory when the program is encoded therein. For example, the scaling routine can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The scaling routine in the examples comprises computer programs, firmware, or some other form of machine-readable processing instructions. The scaling routine may include an operating system, utilities, drivers, network interfaces, applications, virtual machines, or some other type of software. The scaling routine can include additional processes, programs, or components, such as operating system software, database software, or application software. The scaling routine can also comprise firmware or some other form of machine-readable processing instructions executable by the processing system.

The scaling routine in the examples can include additional processes, programs, or components, such as operating system software, database software, or application software. The scaling routine can also comprise firmware or some other form of machine-readable processing instructions executable by the processing system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. An industrial automation workstation configured to scale and display text destined for a target industrial automation device, comprising:
   a communication interface configured to transfer operational software to the target industrial automation device, the operational software comprising display data including at least one text string; and
   a processing system configured to:
     inspect the operational software;
     obtain a target device dots-per-inch (DPI) for a display device of the target industrial automation device from the inspection;
     render the at least one text string at the target device DPI;
     generate a scaling factor comprising a ratio of a workstation DPI divided by the target device DPI;
     scale the at least one text string using the scaling factor;
     generate a scaled text string;
     display the scaled text string on a display device of the industrial automation workstation; and
     transfer the operational software to the target industrial automation device via the communication interface.

2. The industrial automation workstation of claim 1, wherein the at least one text string comprises a sequence of alphanumeric characters or symbols.

3. The industrial automation workstation of claim 1, wherein the scaled text string comprises a sequence of alphanumeric characters or symbols and wherein non-alphanumeric display elements of the display data are scaled using the scaling factor.

4. The industrial automation workstation of claim 1, wherein the processing system is further configured to send the at least one scaled text string to a display element that is identical to an industrial automation device display.

5. The industrial automation workstation of claim 1, wherein the at least one scaled text string is scaled to substantially match a physical length of the display device of the industrial automation workstation.

6. A display method in an industrial automation workstation for scaling and displaying text destined for a target industrial automation device, comprising:
   in the industrial automation workstation, inspecting operational software to be transferred to the target industrial automation device, the operational software comprising display data including at least one text string;
   in the industrial automation workstation, obtaining a target device dots-per-inch (DPI) for a display device of the target industrial automation device from the inspection;
   in the industrial automation workstation, rendering the at least one text string at the target device DPI;
   in the industrial automation workstation, generating a scaling factor comprising a ratio of a workstation DPI divided by the target device DPI;
   in the industrial automation workstation, scaling the at least one text string using the scaling factor and generate a scaled text string;
   in the industrial automation workstation, displaying the scaled text string on a display device of the industrial automation workstation; and
   in the industrial automation workstation, transferring the operational software to the target industrial automation device via the communication interface.

7. The display method of claim 6, wherein the at least one text string comprises a sequence of alphanumeric characters or symbols.

8. The display method of claim 6, wherein the scaled text string comprises a sequence of alphanumeric characters or symbols and wherein non-alphanumeric display elements of the display data are scaled using the scaling factor.

9. The display method of claim 6, wherein the display method further comprises sending the at least one scaled text string to a display element that is identical to an industrial automation device display.

10. The display method of claim 6, wherein the at least one scaled text string is scaled to substantially match a physical length of the display device of the industrial automation workstation.

11. One or more computer-readable storage media having program instructions stored thereon for a display method in an industrial automation workstation for scaling and displaying text destined for a target industrial automation device that, when executed by a processing system, direct the processing system to at least:
   inspect operational software comprising display data including at least one text string;
   obtain a target device dots-per-inch (DPI) for a display device of the target industrial automation device from the inspection;
   render the at least one text string at the target device DPI;
   generate a scaling factor comprising a ratio of a workstation DPI divided by the target device DPI;

scale the at least one text string using the scaling factor and generate a scaled text string;

display the scaled text string on a display device of the industrial automation workstation; and transfer the operational software to the target industrial automation device.

12. The computer-readable storage media of claim 11, wherein the at least one text string comprises a sequence of alphanumeric characters or symbols.

13. The computer-readable storage media of claim 11, wherein the scaled text string comprises a sequence of alphanumeric characters or symbols and wherein non-alphanumeric display elements of the display data are scaled using the scaling factor.

14. The computer-readable storage media of claim 11, wherein the program instructions further direct the processing system to send the at least one scaled text string to a display element that is identical to an industrial automation device display.

* * * * *